United States Patent [19]

Frank et al.

[11] Patent Number: 5,338,163

[45] Date of Patent: Aug. 16, 1994

[54] ELECTROHYDRAULIC DEVICE, PARTICULARLY ELECTRICAL FUEL PUMP FOR MOTOR VEHICLE

[75] Inventors: Kurt Frank, Schorndorf-Haubersbronn; Johann Attenni, Pfoerring; Albert Schmidt, Ingolstadt; Max Weigl, Altmannstein, all of Fed. Rep. of Germany

[73] Assignee: Robert Bosch GmbH, Stuttgart, Fed. Rep. of Germany

[21] Appl. No.: 987,114

[22] Filed: Dec. 4, 1992

[30] Foreign Application Priority Data

Dec. 12, 1991 [DE] Fed. Rep. of Germany ....... 4140961

[51] Int. Cl.5 .............................................. F04B 35/04
[52] U.S. Cl. .................. 417/410 R; 417/360; 123/497; 439/190
[58] Field of Search ............... 417/410 R, 360; 439/130, 190, 195; 123/495, 509, 497

[56] References Cited

U.S. PATENT DOCUMENTS

| | | | |
|---|---|---|---|
| 4,569,637 | 2/1986 | Tuckey | 417/410 R |
| 4,651,701 | 3/1987 | Weaver | 123/509 |
| 4,869,225 | 9/1989 | Nagata et al. | 123/509 |
| 4,895,495 | 1/1990 | Arai | 417/360 |
| 4,945,884 | 8/1990 | Coma et al. | 123/509 |
| 5,040,954 | 8/1991 | Iwai | 123/509 |
| 5,050,567 | 9/1991 | Suzuki | 123/497 |
| 5,056,492 | 10/1991 | Panse | 123/509 |
| 5,064,342 | 11/1991 | Iwai | 415/55.1 |
| 5,080,077 | 1/1992 | Sawert et al. | 123/509 |
| 5,129,834 | 7/1992 | Crawford | 439/130 |

FOREIGN PATENT DOCUMENTS 1161167 4/1958 France .................. 123/497

Primary Examiner—Richard A. Bertsch
Assistant Examiner—Peter Korynyk
Attorney, Agent, or Firm—Michael J. Striker

[57] ABSTRACT

An electrohydraulic device, particularly an electric fuel pump for motor vehicle comprises a housing, a hydraulic connecting pipe and at least one electrical connecting plug for hydraulic medium and current supply respectively, a hydraulic conduit and a current cable extending to the housing, and a plug head. The hydraulic conduit and the current cable are connected with the plug head. The plug head is fitted over the connecting pipe and the connecting plug so as to establish hydraulic and electrical connection between the hydraulic conduit and the connecting pipe on the one hand and the current cable and the connecting pipe on the other hand.

14 Claims, 4 Drawing Sheets

ELECTROHYDRAULIC DEVICE, PARTICULARLY ELECTRICAL FUEL PUMP FOR MOTOR VEHICLE

BACKGROUND OF THE INVENTION

The present invention relates to a electrohydraulic device, particularly an electrical fuel pump for a motor vehicle.

More particularly, it relates to such an electrohydraulic device which has a housing, a hydraulic connecting pipe arranged on the housing, at least one electrical connecting plug for hydraulic and current supply, and a hydraulic conduit and a current cable extending to the housing.

In electrical fuel pumps of the above mentioned type the hydraulic conduit which is formed as a pressure hose is fitted on the connecting pipe and mounted on it by a hose clamp. Both cores of the two-core current cable are connected at the end side with a cable shoe. Both cable shoes are fitted on both connecting plugs formed as flat plugs. This process must be performed during the installation of the electric fuel pump in situ or in other words in the vehicle. It makes the end mounting quite time consuming.

SUMMARY OF THE INVENTION

Accordingly, it is an object of the present invention to provide an electrohydraulic device of the above mentioned general type, which avoids the disadvantages of the prior art.

In keeping with these objects and with others which will become apparent hereinafter, one feature of the present invention resides, briefly stated, in an electrohydraulic device of the above mentioned type, in which the hydraulic conduit and the current cable are fitted on a plug head arranged in an inverted position over the connecting pipe and the connecting plug so as to establish the hydraulic and electrical connection between the hydraulic conduit and the connecting pipe on the one hand, and the current cable and the connecting plug on the other hand.

When the electrohydraulic device is designed in accordance with the present invention, the plug head which simultaneously contains the hydraulic and the electrical interface provides for the electrohydraulic device a connection which can be fast established and released in situ, and in a single step both the hydraulic and the electrical connection can be established or interrupted.

The plug head is premounted with the hydraulic conduit and the current cable so that the required mounting time in situ is substantially reduced. For securing the hydraulic connection and the electrical connection on the electrohydraulic device, moreover only a single securing element which locks the plug head on the housing is required, and not separate securing elements for the hydraulic conduit and the current cable. This results in saving in the manufacturing cost.

As for the hydraulic connection and the electrical connection in the inventive plug head, in another advantageous embodiment of the present invention the plug head has a connecting sleeve which surrounds the connecting pipe in a fluid tight manner, and at least one cable shoe which is nondisplaceably held in the plug head.

The sleeve which is produced of synthetic plastic material and is of one piece with the plug head, opens into a hose pipe which projects from the plug head. The hydraulic conduit is fitted on the hose pipe in form of a pressure hose and mounted by means of a hose clamp. At least one cable shoe is connected with the current cable and extends through an opening of the plug head. The fluid tight connection between the plug head and the connecting pipe is obtained by an O-ring which is inserted in a ring groove in the surface of the connecting pipe and pressed against the inner wall of the connecting sleeve which is of one piece with the plug head.

In accordance with a preferable embodiment of the invention, the plug head is locked on the housing for preventing undesired falling-off during the operation. For this purpose the plug head is engaged by a U-shaped spring clamp which is arrested with its both U-legs on the housing so that the web connecting the legs is pressed against the plug head.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
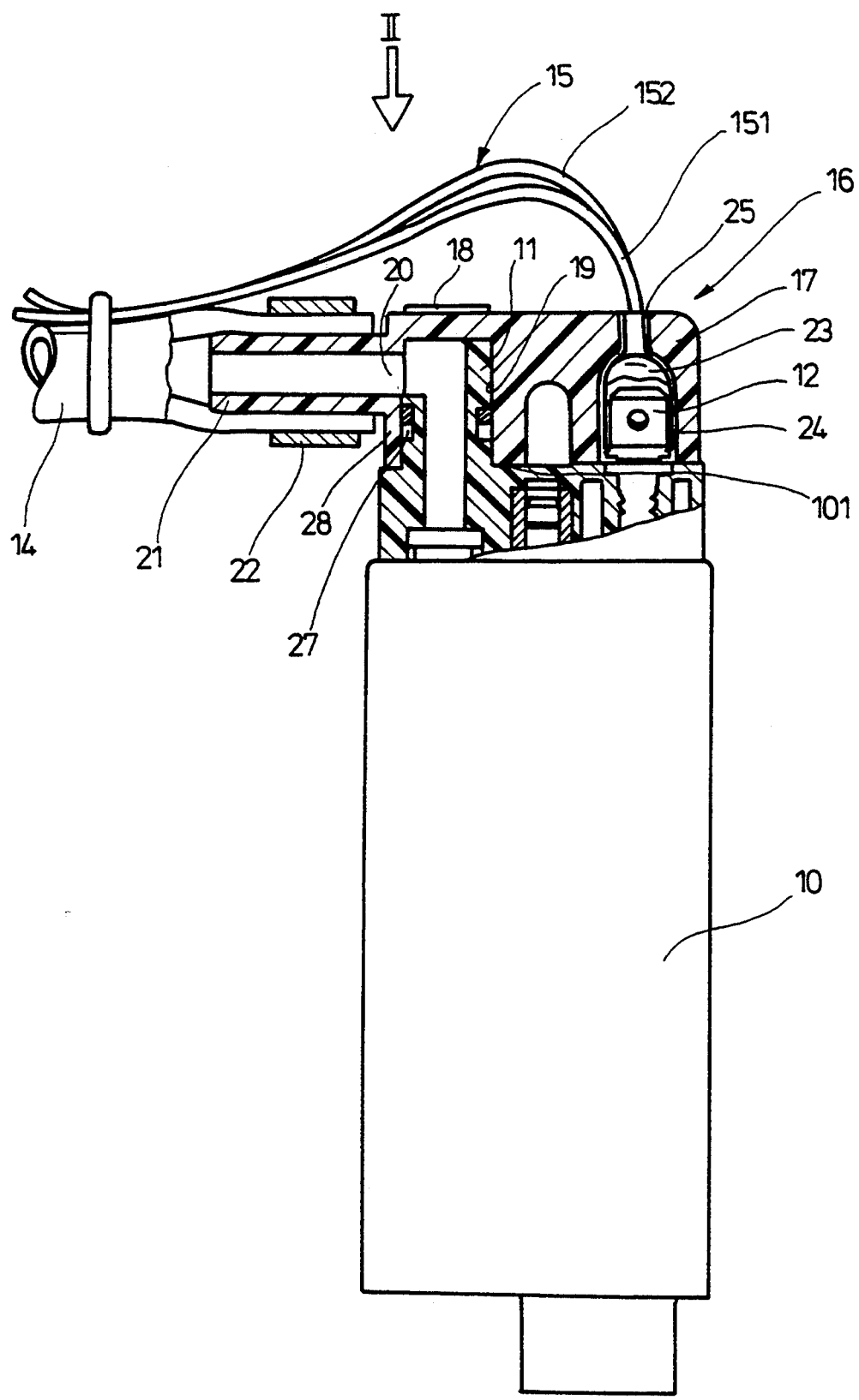
FIG. 1 is a side view of a finally mounted electric fuel pump in accordance with the present invention, partially sectioned.

An electrohydraulic device in accordance with the present invention is illustrated as an electrical fuel pump for a motor vehicle. The pump has a cylindrical housing 10, a connecting pipe 11 and two electrical connecting plugs 12 formed as flat plugs project from the upper side 101 of the housing 10. Only the rear connecting plug 12 of the two connecting plugs is shown. The connecting pipe 11 provides the hydraulic communication for the electrical fuel pump, while the electrical connecting plug 12 provides the current supply to the electrical fuel pump.

For this purpose the pump is provided with a hydraulic conduit formed as a pressure hose 14 and a two-core electrical current cable 15. The pressure hose 14 and the current cable 15 are guided at their ends in a plug head 17, which can establish the hydraulic and electrical connection for the electrical fuel pump in a single step.

Figure 5:
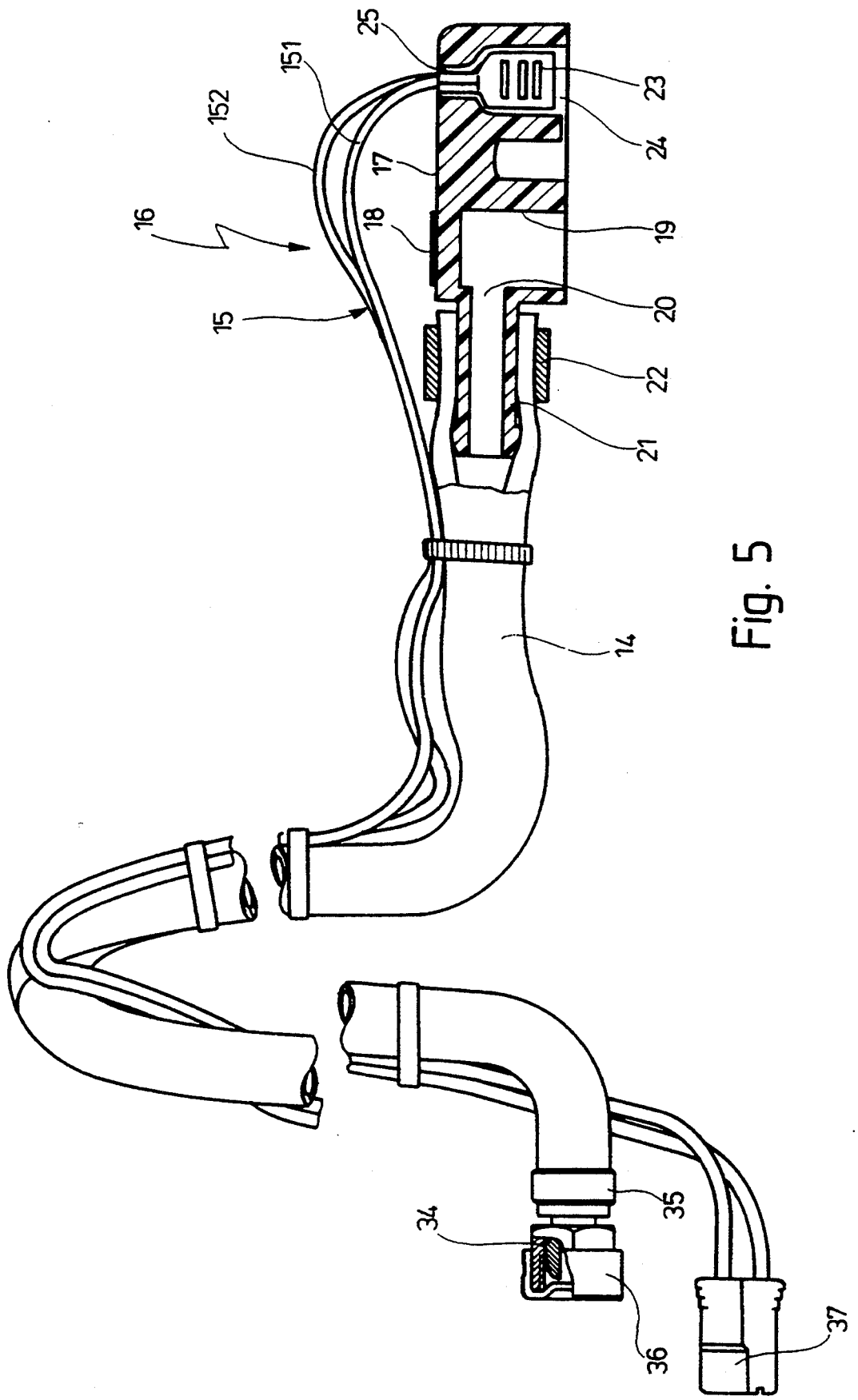
FIG. 5 is a side view of a premounted mounting plug of the electric fuel pump in accordance with the present invention, partially sectioned.

The plug head 17, the pressure hose 14 and the current cable 15 are premounted to form a complete structural unit or in other words a so-called mounting plug 16 which is shown in FIG. 5. As for mounting of the electrical fuel pump in the motor vehicle, the mounting plug 16 is simply fitted on the pump. For this purpose the plug head 17 is composed of synthetic plastic material, is fitted over the connecting pipe 11 and both connecting plugs 12 on the upper side 101 of the housing 10 and locked on the housing 10 by a spring clamp 18 as shown in FIG. 1.

The plug head 17 is provided with a cup-shaped fitting sleeve 19 which is formed of one piece with the plug head and made as a blind hole provided at the lower side of the plug head. The interior of the fitting sleeve 19 is connected through a radial opening 20 with the hose pipe 21 which extends laterally from the plug head 17 and is fitted on the end of the pressure hose 14. The pressure hose 14 is clamped on the hose pipe 21 by a hose clamp 22. Furthermore, two cable shoes 23 are axially non-displaceably held in the plug head 17. They are received in a pocket 24 and locked there. Each cable shoe 23 is electrically connected with a core 151 or 152 of the current cable 15, and both cores 151, 152 extend through a respective opening 25 in the plug head 17.

Figure 2:
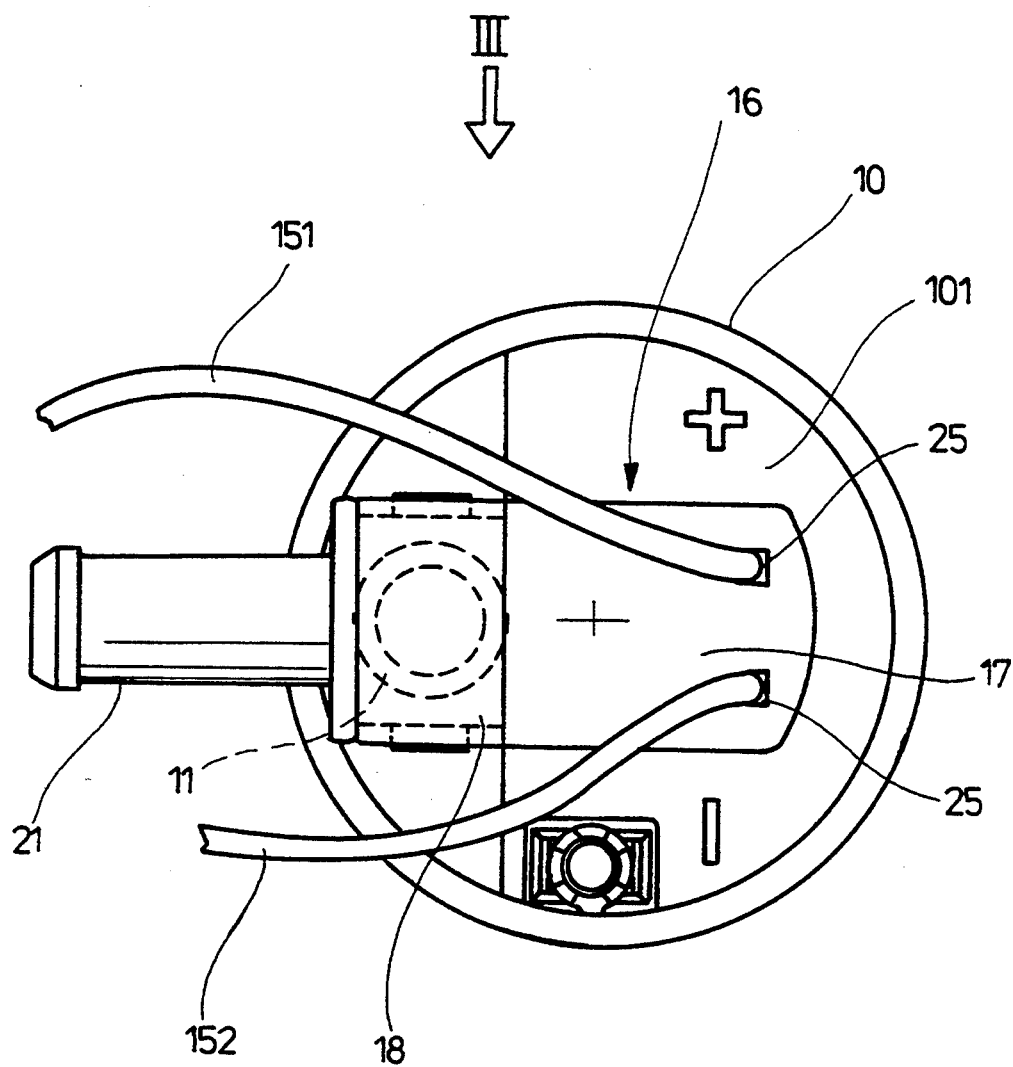
FIG. 2 is a plan view of the electric fuel pump as seen in direction of the arrow II in FIG. 1, with a removed hydraulic conduit.

As shown in FIGS. 1 and 5 from two cable shoes 23 and two pockets 24 for passing the cores 151,152 only one rear cable shoe 23 and the rear pocket 24 as well as the rear opening 25 can be seen. The other pocket 24 with the other received cable shoe 23 and the front opening 24 which is seen in FIG. 2 are arranged in an axes-symmetrical fashion relative to the rear pocket 24. The shape of the cable shoe 23 and the arrangement of the pocket 24 and the fitting sleeve 19 in the plug head 17 are selected so that during fitting of the plug head 17 on the upper surface 101 of the housing 10, the fitting sleeve 19 surrounds the connecting pipe 11 in a fluid tight manner and the cable shoe 23 is fitted on the respective connecting plug 12. For obtaining the fluid tight connection, an O-ring 28 is inserted in a ring groove 27 on the outer surface of the connecting pipe 11. When the fitting sleeve 19 is fitted in its inverted position, it presses against the inner wall as shown in FIGS. 1 and 4.

Figure 3:
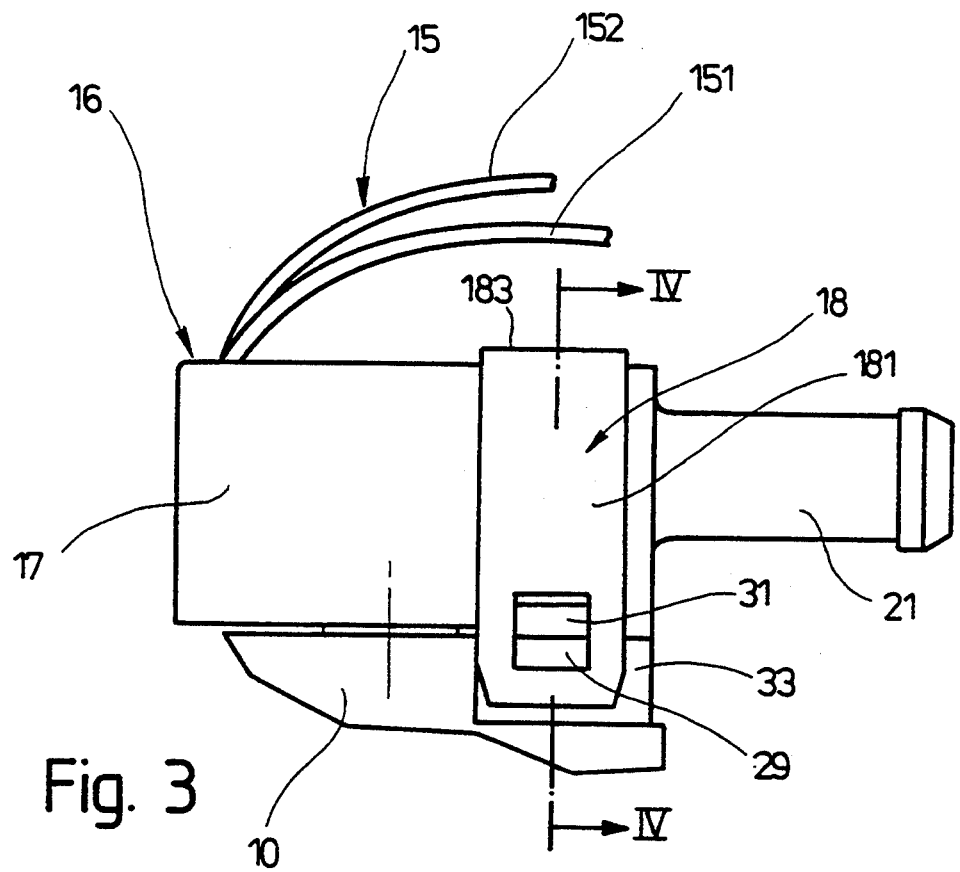
FIG. 3 is a side view of the electric fuel pump as seen in direction of the arrow III in FIG. 2.
Figure 4:
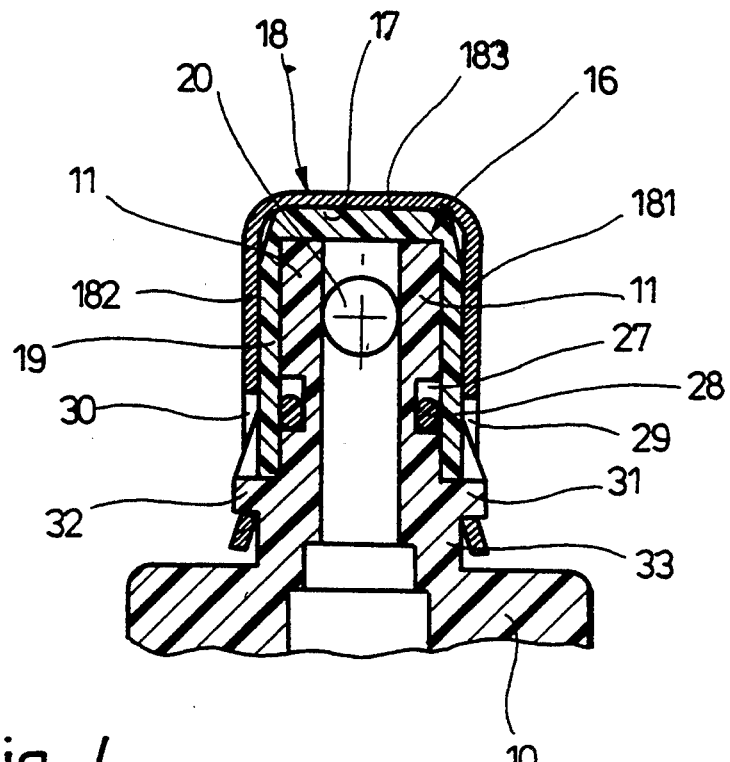
FIG. 4 is a view showing a section along the line IV—IV in FIG. 3.

A spring clamp 18 which is fitted on the plug head 17 for its securing and locked on the housing 10 is shown in FIG. 3 on a side view and in FIG. 4 in cross-section. The spring clamp 18 which is preferably composed of spring steel is U-shaped and is provided with arresting recesses 29 and 30 at the ends of its both legs. Each arresting recess 29, 30 corresponds to an arresting projection 31, 32. The arresting projections 31 and 32 are formed on a neck 33 of the housing 10 which is of one piece and projects in the connecting pipe 11. The spring clamp 18 is plugged with its legs 181,182 over the plug head 17 and pressed downwardly until the arresting projections 31, 32 snap into the arresting recesses 29, 30. In this position the web 183 which connects both legs 181,182 abuts with a prestress against the upper side of the plug head 17 and fixes it on the housing 10.

As can be seen from FIG. 5, the pressure hose 14 on its end which faces the plug head is fitted on a connection piece 34 and fixed there by a hose clamp 35. The connecting piece 34 is connected by a cap nut 36 to a corresponding passage in the motor vehicle. The end of the current cable 15 which faces the plug head is provided with a connecting plug 37.

It will be understood that each of the elements described above, or two or more together, may also find a useful application in other types of constructions differing from the types described above.

While the invention has been illustrated and described as embodied in an electrohydraulic aggregate, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An electrohydraulic device, comprising a housing; a hydraulic connecting pipe for hydraulic medium and at least one electrical connecting plug for current supply projecting out of said housing; a hydraulic conduit and a current cable extending to said housing; and a plug head, said hydraulic conduit and said current cable being connected with said plug head, said plug head being releasably mounted on said housing and fitted over said hydraulic connecting pipe and said at least one electrical connecting plug so as to establish at the same time hydraulic connection between said hydraulic conduit and said connecting pipe and electrical connection between said current cable and said at least one electrical connecting plug, said plug head having a fitting sleeve which surrounds said connecting pipe and is formed of one piece with said plug head, said plug head being also provided with at least one cable shoe for said current cable.

2. A device as defined in claim 1, wherein said said plug head is composed of synthetic plastic material.

3. A device as defined in claim 1, wherein said plug head also has a hose pipe, said fitting sleeve being open into said hose pipe; and further comprising a pressure hose which has a hydraulic conduit and is fitted on said hose pipe.

4. A device as defined in claim 3, wherein said pressure hose has a hose end which is connected with said hose pipe in a force-transmitting manner; and further comprising means for connecting said hose end with said hose pipe.

5. A device as defined in claim 4, wherein said means includes a hose clamp.

6. A device as defined in claim 3; and further comprising at least one sealing element arranged between said connecting pipe and said fitting sleeve.

7. A device as defined in claim 6, wherein said sealing element is an O-ring, said connecting pipe having an outer surface with a ring groove which receives said O-ring.

8. A device as defined in claim 1 wherein said at least one cable shoe is not displaceably held in said plug head and is displaceable at least on said connecting plug, said current cable being connected with said cable shoe.

9. A device as defined in claim 8, wherein said plug head has a pocket in which said cable shoe is fixed and also has an opening through which said current cable extends.

10. An aggregate as defined in claim 1, wherein said plug head is locked in said housing.

11. A device as defined in claim 1, wherein said current cable has an end facing away of said plug head and provided with an electric connecting plug.

12. A device as defined in claim 3, wherein said pressure hose has an end facing said plug head and having a connecting piece provided with a cap nut.

13. An electrohydraulic device, comprising a housing; a hydraulic connecting pipe for hydraulic medium and at least one electrical connecting plug for projecting out of said housing; a hydraulic conduit and a current cable extending to said housing; a plug head, said hydraulic conduit and said current cable being connected with said plug head, said plug head being releasably mounted on said housing and fitted over said hydraulic connecting pipe and said at least one electrical connecting plug so as to establish at the same time hydraulic connection between said hydraulic conduit and said connecting and electrical connection between said current cable and said at least one electrical connecting plug, said plug head having a fitting sleeve which surrounds said connecting pipe and is formed of one piece with said plug head, said plug head being also provided with at least one cable shoe for said current cable; and a U-shaped spring clamp engaging said plug head and having a web and two legs connected by said web, said spring clamp being arrested on said housing so that said web is pressed against said plug head.

14. A device as defined in claim 13, wherein each of said legs of said spring clamp has an arresting opening, said housing being provided with radially projecting arresting grooves located underneath said plug head and corresponding to said arresting openings.

* * * * *